United States Patent

(12) United States Patent
Ao

(10) Patent No.: US 7,290,449 B2
(45) Date of Patent: Nov. 6, 2007

(54) PHYSICAL QUANTITY SENSOR HAVING ANGULAR SPEED SENSOR AND ACCELERATION SENSOR

(75) Inventor: Kenichi Ao, Tokai (JP)

(73) Assignee: DENSO CORPORATION, Kariya (JP)

( * ) Notice: Subject to any disclaimer, the term of this patent is extended or adjusted under 35 U.S.C. 154(b) by 272 days.

(21) Appl. No.: 11/079,246

(22) Filed: Mar. 15, 2005

(65) Prior Publication Data

US 2005/0217377 A1 Oct. 6, 2005

(30) Foreign Application Priority Data

Mar. 30, 2004 (JP) .............................. 2004-099739

(51) Int. Cl.
 G01C 19/56 (2006.01)
 G01P 9/04 (2006.01)
(52) U.S. Cl. ..................................... 73/510; 73/504.12
(58) Field of Classification Search ............. 73/504.04, 73/504.12, 510
 See application file for complete search history.

(56) References Cited

U.S. PATENT DOCUMENTS 6,658,937 B2 * 12/2003 Ao et al. .................. 73/504.12
7,004,025 B2   2/2006 Tamura
2002/0051258 A1 5/2002 Tamura

FOREIGN PATENT DOCUMENTS

| JP | A-08-122172 | 5/1996 |
| JP | A-09-210691 | 8/1997 |
| JP | A-10-239064 | 9/1998 |
| JP | A-11-064001 | 3/1999 |
| JP | A-2000-028365 | 1/2000 |
| JP | A-2003-028647 | 1/2003 |

OTHER PUBLICATIONS

Notice of Reason for Refusal from Japanese Patent Office issued on Mar. 17, 2006 for the corresponding Japanese patent application No. 2004-099739 (a copy and English translation thereof).
Notice of Reason for Refusal from Japanese Patent Office issued on Apr. 2, 2007 for the corresponding Japanese patent application No. 2004-099739 (a copy and English translation thereof).

* cited by examiner

Primary Examiner—John E. Chapman
(74) Attorney, Agent, or Firm—Posz law Group, PLC

(57) ABSTRACT

A physical quantity sensor includes: a substrate; an angular speed sensor disposed on the substrate; and an acceleration sensor disposed on the substrate. The angular speed sensor includes an oscillator capable of oscillating by a driving force and displaceable in accordance with a Coriolis force attributed to an angular speed of the oscillator. The acceleration sensor includes a movable portion displaceable in accordance with an acceleration applied to the acceleration sensor. The oscillator has a driving direction, which is not parallel to a displacement direction of the movable portion. The physical quantity sensor having the angular speed sensor and the acceleration sensor detects both of the angular speed and the acceleration with high accuracy.

8 Claims, 5 Drawing Sheets

PHYSICAL QUANTITY SENSOR HAVING ANGULAR SPEED SENSOR AND ACCELERATION SENSOR

CROSS REFERENCE TO RELATED APPLICATION

This application is based on Japanese Patent Application No. 2004-99739 filed on Mar. 30, 2004, the disclosure of which is incorporated herein by reference.

FIELD OF THE INVENTION

The present invention relates to a physical quantity sensor having an angular speed sensor and an acceleration sensor.

BACKGROUND OF THE INVENTION

In an oscillation type angular speed sensor having an oscillator, the oscillator oscillates with a predetermined frequency. When an angular speed is applied to the sensor, a Coriolis force is generated in the oscillator so that the oscillator is displaced. The displacement of the oscillator is detected so that the angular speed is detected.

This oscillation type angular speed sensor and an acceleration sensor are mounted on one mounting base such as a circuit chip or a substrate so that a physical quantity sensor is formed. The physical quantity sensor can detect both of the acceleration and the angular speed. However, the oscillation of the oscillator may transmit to the acceleration sensor so that the acceleration sensor is also oscillated even though no acceleration is applied to the sensor. Thus, the detection accuracy of the acceleration sensor is deteriorated. This transmit of the oscillation is a leakage of the oscillation.

To prevent the leakage of the oscillation to the acceleration sensor, the angular speed sensor is sealed in vacuum, and the acceleration sensor is sealed in an atmospheric pressure. In this case, the leakage of the oscillation from the angular speed sensor to the acceleration sensor is reduced by an air damping effect. This type of physical quantity sensor is disclosed in, for example, US Patent Application Publication No. 2002-0051258.

However, since the air damping type physical quantity sensor bas a vacuum sealing construction, a total construction of the sensor becomes complicated. Thus, a manufacturing cost of the sensor becomes higher.

SUMMARY OF THE INVENTION

In view of the above-described problem, it is an object of the present invention to provide a physical quantity sensor having an oscillation type angular speed sensor and an acceleration sensor for detecting both of an angular speed and an acceleration with high accuracy.

A physical quantity sensor includes: a substrate; an angular speed sensor disposed on the substrate; and an acceleration sensor disposed on the substrate. The angular speed sensor includes an oscillator capable of oscillating by a driving force and displaceable by a Coriolis force attributed to an angular speed of the oscillator. The acceleration sensor includes a movable portion displaceable in accordance with an acceleration of the acceleration sensor. The oscillator has a driving direction, which is not parallel to a displacement direction of the movable portion.

In the above sensor, the influence of the oscillation of the oscillator in the angular speed sensor is reduced in the acceleration sensor so that the detection accuracy of the acceleration sensor is not affected by the oscillation of the oscillator. Thus, the sensor can detect both of the angular speed and the acceleration with high accuracy. Further, the construction of the sensor is not complicated so that the manufacturing cost of the sensor becomes lower.

Further, a physical quantity sensor includes: a mounting base; an angular speed sensor disposed on the mounting base; and an acceleration sensor disposed on the mounting base. The angular speed sensor includes an oscillator capable of oscillating by a driving force and capable of being displaced by a Coriolis force attributed to an angular speed applied to the angular speed sensor. The acceleration sensor includes a movable portion displaceable in accordance with an acceleration applied to the acceleration sensor. The oscillator of the angular speed sensor has a resonant frequency in a driving direction. The movable portion of the acceleration sensor has another resonant frequency in a displacement direction. The resonant frequency of the oscillator is equal to or larger than square root of two times the resonant frequency of the movable portion.

In the above sensor, the influence of the oscillation of the oscillator in the angular speed sensor is reduced appropriately in the acceleration sensor so that the detection accuracy of the acceleration sensor is not affected by the oscillation of the oscillator. Thus, the sensor can detect both of the angular speed and the acceleration with high accuracy. Further, the construction of the sensor is not complicated so that the manufacturing cost of the sensor becomes lower.

Further, a physical quantity sensor includes: a mounting base; an angular speed sensor disposed on the mounting base; and an acceleration sensor disposed on the mounting base. The angular speed sensor includes an oscillator capable of oscillating by a driving force and capable of being displaced by a Coriolis force attributed to an angular speed applied to the angular speed sensor. The acceleration sensor includes a movable portion displaceable in accordance with an acceleration applied to the acceleration sensor. The oscillator of the angular speed sensor has a resonant frequency in the driving direction. The angular speed sensor is disposed on the mounting base through an adhesive layer. The adhesive layer of the angular speed sensor has another resonant frequency. The resonant frequency of the oscillator is equal to or larger than square root of two times the resonant frequency of the adhesive layer.

The above sensor can detect both of the angular speed and the acceleration with high accuracy. Further, the construction of the sensor is not complicated so that the manufacturing cost of the sensor becomes lower.

Further, a physical quantity sensor includes: a mounting base; an angular speed sensor disposed on the mounting base; and an acceleration sensor disposed on the mounting base. The angular speed sensor includes an oscillator capable of oscillating by a driving force and capable of being displaced by a Coriolis force attributed to an angular speed applied to the oscillator. The acceleration sensor includes a movable portion displaceable in accordance with an acceleration applied to the acceleration sensor. The oscillator of the angular speed sensor has a resonant frequency in the driving direction. The acceleration sensor is disposed on the mounting base through an adhesive layer. The adhesive layer of the acceleration sensor has another resonant frequency. The resonant frequency of the oscillator is equal to or larger than square root of two times the resonant frequency of the adhesive layer.

The above sensor can detect both of the angular speed and the acceleration with high accuracy. Further, the construction of the sensor is not complicated so that the manufacturing cost of the sensor becomes lower.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

First Embodiment

Figure 1:
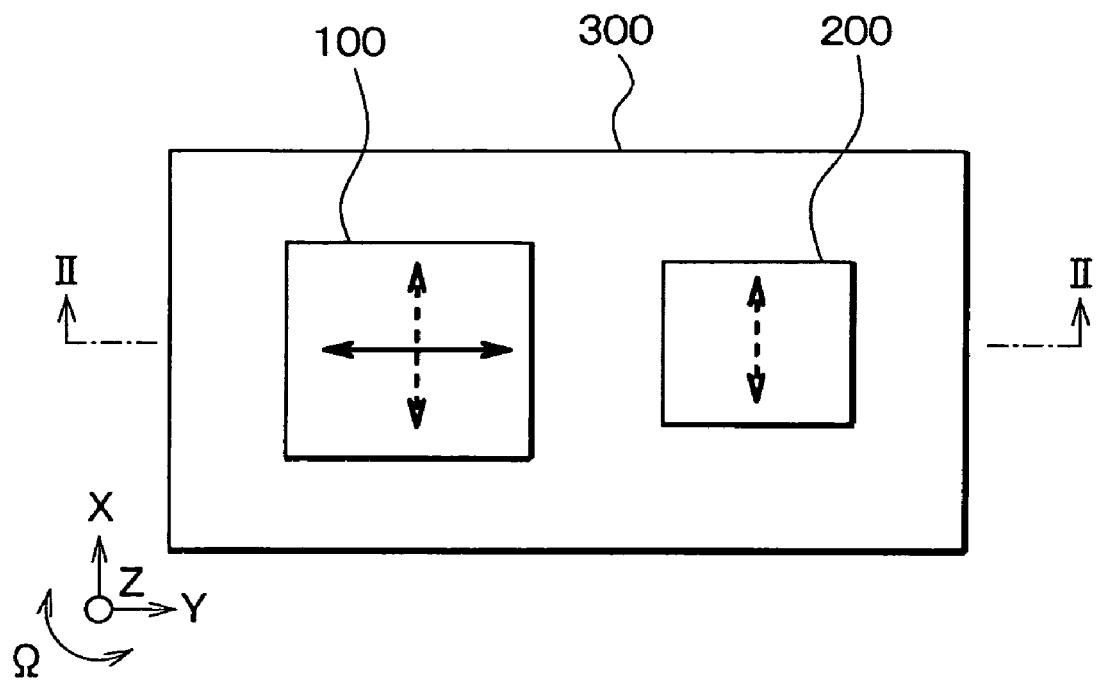
FIG. 1 is a plan view showing a physical quantity sensor according to a first embodiment of the present invention.
Figure 2:
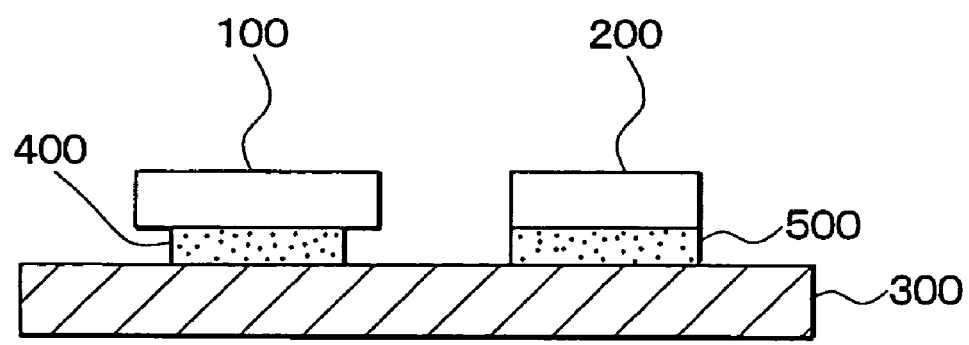
FIG. 2 is a cross sectional view showing the sensor taken along line II-II in FIG. 1.

A physical quantity sensor according to a first embodiment of the present invention is shown in FIGS. 1 to 4. The sensor includes an acceleration sensor chip 200 and an angular speed sensor chip 100. These sensor chips 100, 200 are mounted on a mounting base 300 as a substrate. The mounting base 300 includes a circuit chip, a substrate and the like. The angular speed sensor 100 is bonded to the mounting base 300 with an adhesive layer 400, and the acceleration sensor chip 200 is bonded to the mounting base 300 with another adhesive layer 500. The angular speed sensor chip 100 is an oscillation type angular speed sensor having an oscillator. A driving direction, i.e., an oscillating direction of the oscillator in the angular speed sensor chip 100 is shown as a solid line in FIG. 1. A detection direction of the angular speed sensor chip 100 is shown as a broken line in FIG. 1. A detection direction of the acceleration sensor chip 200 is also shown as another broken line in FIG. 1. The angular speed sensor chip 100 and the acceleration sensor chip 200 are mounted on the base 300 in such a manner that the driving direction of the angular speed sensor 100 is not parallel to the detection direction of the acceleration sensor chip 200.

Next, the angular speed sensor chip 100 and the acceleration sensor chip 200 are described in detail as follows.

Figure 3:
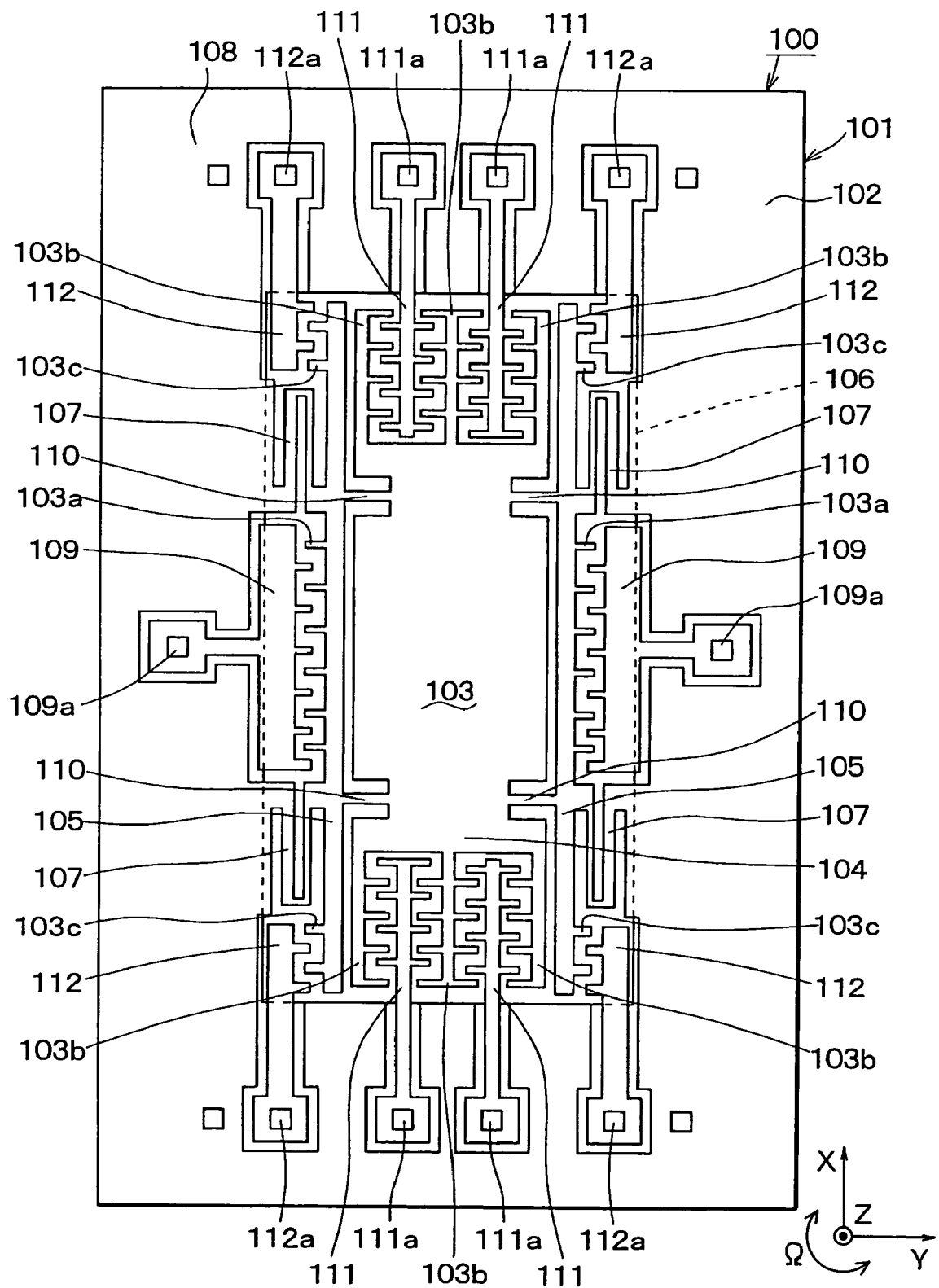
FIG. 3 is a plan view showing an angular speed sensor in the physical quantity sensor according to the first embodiment.

FIG. 3 shows the angular speed sensor chip 100. The angular speed sensor chip 100 is formed of a SOI (i.e., silicon on insulator) substrate 101 by using a conventional semiconductor manufacturing process. The SOI substrate 101 has a pair of silicon layers bonded with an insulation layer. The SOI substrate 101 includes an upper silicon layer 102 and a lower silicon layer. FIG. 3 shows the upper silicon layer 102 in the SOI substrate 101. The upper silicon layer 102 is processed by a conventional etching method so that grooves are formed and parts are also formed. An oscillator 103 as a weight portion is formed on a concavity 106, which is formed by removing part of the insulation film and a lower silicon layer. The upper silicon layer 102 is supported by the insulation film and the lower silicon layer as the other silicon layer. The oscillator 103 includes the first movable portion 104 disposed on a center portion of the upper silicon layer 102 and the second movable portion 105 disposed on both sides of the first movable portion 104 in the Y direction.

The oscillator 103 is supported on a support portion 108 through a driving beam 107 as the first spring and a detection beam 110 as the second spring. The driving beam 107 has a spring function in the Y direction for being movable in the Y direction, and the detection beam 110 has a spring function in the X direction for being movable in the X direction. The support portion 108 is disposed outside of the oscillator 103. Thus, the oscillator 103 is movable in the X direction and the Y direction, which is perpendicular to the X direction, so that the oscillator 103 is capable of oscillating in both directions. A periphery of the oscillator 103 and a part of the support portion 108 in the upper silicon layer 102 have comb-teeth electrodes having comb-teeth portion, respectively. The part of the support portion 108 faces the periphery of the oscillator 103.

Specifically, a driving electrode 109 as a comb-teeth electrode is formed in the part of the support portion 108. The driving electrode 109 applies a driving signal as an electric potential to the oscillator 103 to drive and to oscillate the oscillator 103 in the Y direction. A detection electrode 111 as another comb-teeth electrode is formed in another part of the support portion 108. The detection electrode 111 detects an oscillation of the oscillator 103 in the X direction as a detection signal, in a case where the oscillation of the oscillator 103 is generated when an angular speed Ω around the Z axis perpendicular to the X and Y axes is applied to the angular speed sensor chip 100.

A monitor electrode 112 having a comb-teeth shape is formed outside of the second movable portion 105 in the Y direction. The monitor electrode 112 is provided by the upper silicon layer 102. The monitor electrode 112 is supported on a periphery of the concavity 106. In this embodiment, four monitor electrodes 112 are formed in the angular speed sensor chip 100. The monitor electrode 112 monitors (i.e., detects) the driving oscillation of the oscillator 103 in the Y direction so that the monitor electrode 112 detects a monitor signal corresponding to the driving oscillation. Each electrode 109, 111, 112 has an electrode pad 109a, 111a, 112a for wire bonding.

The oscillator 103 includes comb-teeth portions 103a, 103b, 103c, which correspond to the electrodes 109, 111, 112. The first comb-teeth portion 103a having comb-teeth shape faces the driving electrode 109, the second comb-teeth portion 103b faces the detection electrode 111, and the third comb-teeth portion 103c faces the monitor electrode 112 in such a manner that comb-teeth of each of the electrodes 109, 111, 112 and the portions 103a to 103c engages together.

An alternating driving signal, i.e., an alternating electric voltage having a frequency equal to a resonant frequency of the oscillator 103 in the Y direction is applied between the driving electrode 109 and the first comb-teeth electrode 103a of the oscillator 103. The first comb-teeth electrode 103a is used for oscillating the oscillator 103, and therefore, the first comb-teeth portion 103a works as a driving comb-teeth portion. Thus, the oscillator 103 is oscillated in the Y direction through the driving beam 107. In a case where the angular speed is applied to the angular speed sensor chip 100 when the oscillator 103 is oscillated, a Coriolis force is generated in the oscillator 103 in the X direction so that the oscillator 103 is oscillated in the X direction through the detection beam 110. This oscillation as a detection oscillation causes to change an electric capacitance of a capacitor between the detection electrode 111 and the second comb-teeth portion 103b of the oscillator 103. Thus, the second comb-teeth portion 103b works as a detection comb-teeth portion. Therefore, by detecting the capacitance change of the capacitor between the detection electrode 111 and the second comb-teeth portion 103b, the angular speed around the Z axis is obtained.

Figure 4:
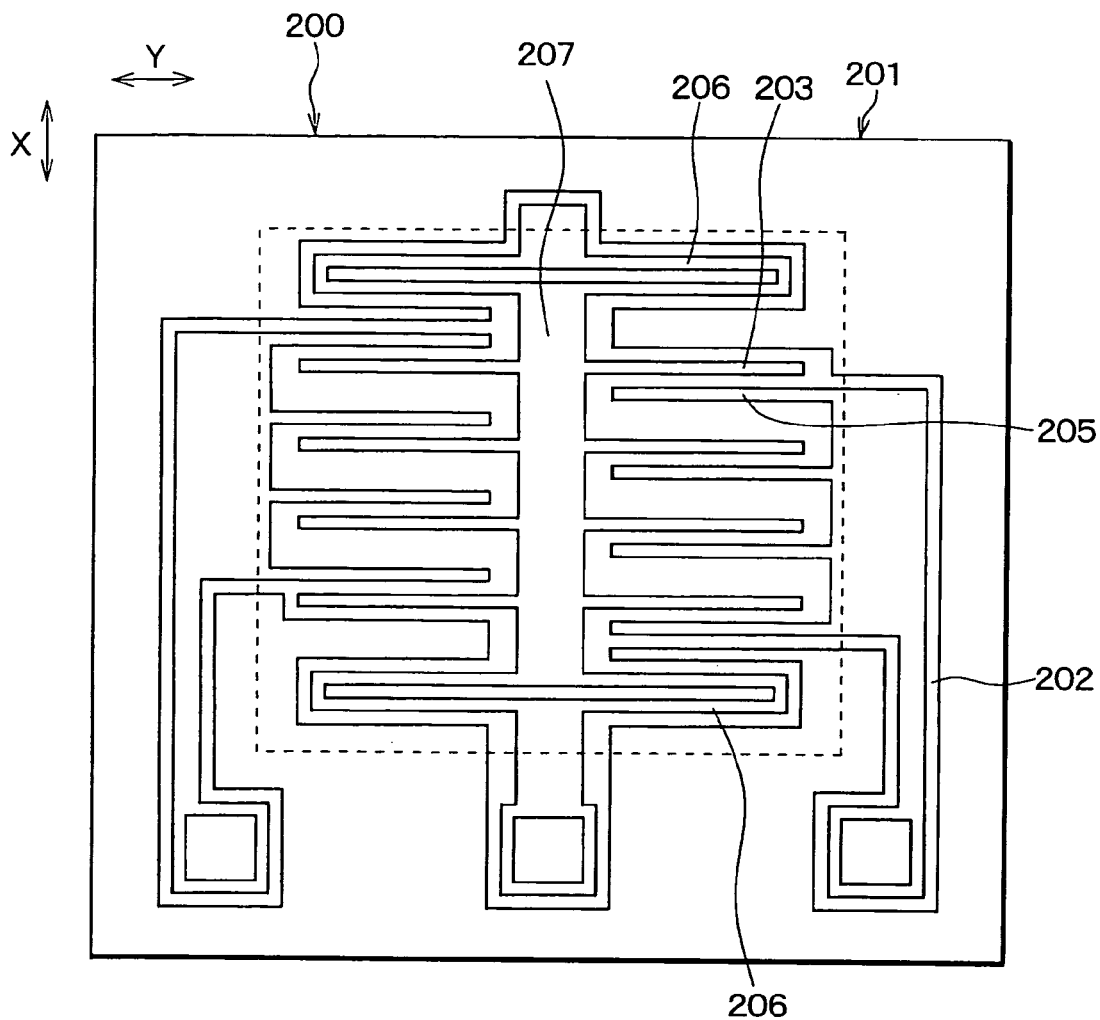
FIG. 4 is a plan view showing an acceleration sensor in the physical quantity sensor according to the first embodiment.

Next, the acceleration sensor chip 200 is described with reference to FIG. 4. The acceleration sensor chip 200 is formed from a semiconductor substrate 201. The substrate 201 is etched so that a groove 202, a movable portion 207 having a movable electrode 203, and a fixed electrode 205 are formed. The movable electrode 203 and the fixed electrode 205 have comb-teeth portions, respectively. The movable electrode 203 is displaced in accordance with an acceleration applied to the acceleration sensor chip 200. The fixed electrode 205 faces the movable electrode 203 in such a manner that each comb-teeth portion of the fixed electrode 205 and the movable electrode 203 is engaged together. Thus, a detection surface of one comb-tooth of the fixed electrode 205 faces a corresponding detection surface of one comb-tooth of the movable electrode 203 so that a capacitor therebetween is provided.

The movable portion 207 is supported on the semiconductor substrate 201 as a support substrate through a spring 206. Therefore, the movable portion 207 is movable in the X direction. When the acceleration in the X direction is applied to the acceleration sensor chip 200, the movable portion 207 is displaced in the X direction. A distance between the detection surface of the movable electrode 203 and the detection surface of the fixed electrode 205 is changed in accordance with the displacement of the movable electrode 203 so that a capacitance of the capacitor between the movable electrode 203 and the fixed electrode 205 is changed. The capacitance change of the capacitor is detected so that the acceleration is detected.

Thus, in the physical quantity sensor, the angular speed sensor chip 100 is mounted on the base 300 in such a manner that the oscillation direction of the oscillator 103 is the Y direction and the detection direction of the chip 100 is the X direction. Further, the acceleration sensor chip 200 is mounted on the base 300 in such a manner that the displacement of the movable electrode 203 in the chip 200 is in the X direction.

Thus, the driving direction of the oscillator 103 in the angular speed sensor chip 100 does not coincide with the displacement direction of the movable electrode 203 in the acceleration sensor chip 200. Therefore, the driving oscillation of the oscillator 103 in the chip 100 is prevented from affecting the detection accuracy of the acceleration sensor chip 200. Specifically, when the driving direction of the oscillator 103 and the displacement direction of the movable portion 207 have an angle defined as θ therebetween, the oscillation amplitude of the oscillator 103 in the displacement direction of the movable portion 207 is determined by the oscillation amplitude of the oscillator 103 in the oscillation direction multiplied by cos θ. Thus, the influence of the oscillation of the oscillator 103 affecting to the acceleration sensor chip 200 is reduced by a factor of cos θ.

In this embodiment, the angle between the driving direction of the oscillator 103 and the displacement direction of the movable electrode 203 is determined to be 90 degrees. Therefore, since the value of cos 90° is zero, the oscillation of the oscillator 103 does not affect the acceleration sensor chip 200 substantially. Specifically, the oscillation amplitude of the oscillator 103 in the chip 100 in the X direction (i.e., the displacement direction of the movable electrode 203) becomes minimum, i.e., zero. Thus, the detection accuracy of the acceleration sensor chip 200 is not affected by the oscillation of the angular speed sensor chip 100.

Thus, the physical quantity sensor having the oscillation type angular speed sensor chip 100 and the acceleration sensor chip 200 detects both of the angular speed and the acceleration with high accuracy.

Further, the construction of the sensor is not complicated so that the manufacturing cost of the sensor becomes lower.

Second Embodiment

Figure 5:
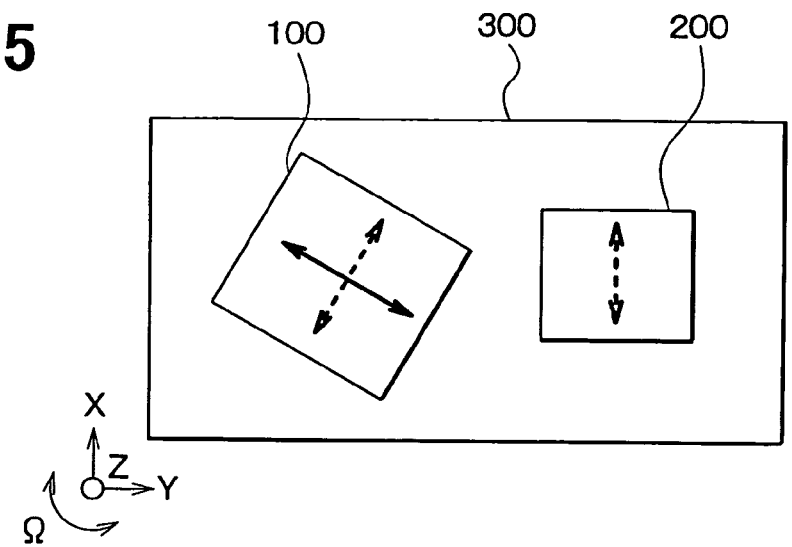
FIG. 5 is a plan view showing a physical quantity sensor according to a second embodiment of the present invention.

A physical quantity sensor according to a second embodiment of the present invention is shown in FIG. 5. The angle between the driving direction of the oscillator 103 and the displacement direction of the movable electrode 203 is set to be 60 degrees.

In this case, since the value of cos 60° is ½, the oscillation amplitude of the oscillator 103 in the chip 100 in the X direction becomes a half. Thus, the influence of oscillation of the angular speed sensor chip 100 to the detection accuracy of the acceleration sensor chip 200 is reduced by half.

Accordingly, when the angle between the driving direction of the oscillator 103 and the displacement direction of the movable electrode 203 is set to be equal to or larger than 60 degrees, i.e., to be in a range between 60 degrees and 120 degrees, the oscillation amplitude of the oscillator 103 in the X direction becomes equal to or smaller than a half.

Thus, the physical quantity sensor having the oscillation type angular speed sensor chip 100 and the acceleration sensor chip 200 detects both of the angular speed and the acceleration with high accuracy.

Third Embodiment

Figure 6:
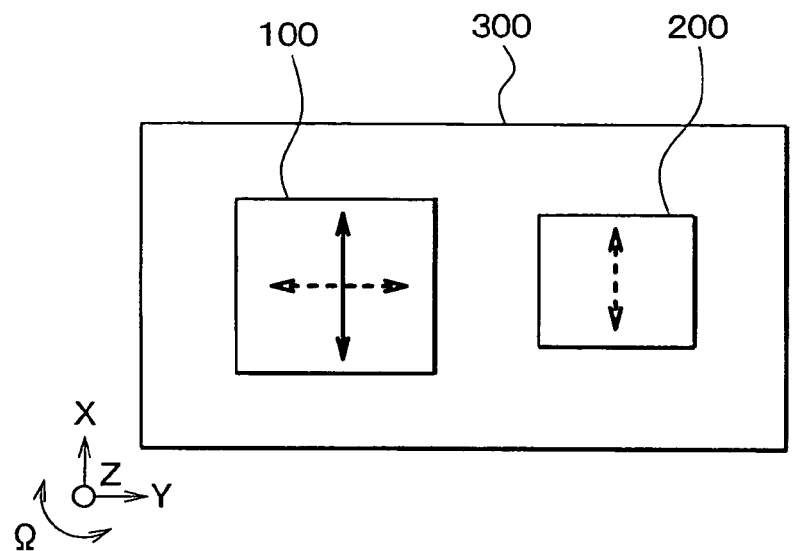
FIG. 6 is a plan view showing a physical quantity sensor according to a third embodiment of the present invention.

A physical quantity sensor according to a third embodiment of the present invention is shown in FIG. 6. The driving direction of the oscillator 103 in the chip 100 coincides with the displacement direction of the movable electrode 203, i.e., the driving direction is parallel to the displacement direction.

Figure 7:
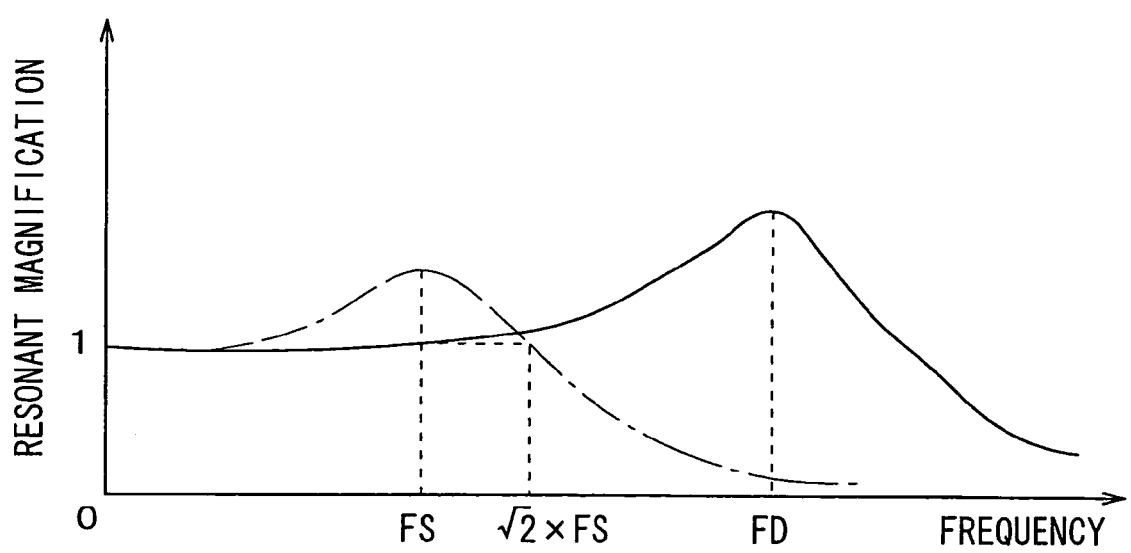
FIG. 7 is a graph showing a relationship between a resonant magnification and a frequency in the angular speed sensor chip and the acceleration sensor chip according to the third embodiment.

FIG. 7 is a graph showing a relationship between a frequency and a resonant magnification (i.e., a resonant ratio). In FIG. 7, a solid line represents a characteristic of a mechanical frequency dependence of the angular speed sensor chip 100 in the driving direction (i.e., the X direction in FIG. 6). A dashed line represents a characteristic of a mechanical frequency dependence of the acceleration sensor chip 200 in the detection direction (i.e., the X direction in FIG. 6).

In general, a characteristic of a mechanical frequency dependence of a massive body has the following characteristic. When the frequency increases from zero, the amplitude of the oscillation of the body becomes maximum at a resonant frequency of the body. Then, the amplitude of the oscillation of the body is reduced as the frequency becomes larger. When the frequency of the oscillation of the body is equal to a square root of two times the resonant frequency of the massive body, the amplitude of the oscillation of the body is equal to that at the frequency of zero. Further, as the frequency of the oscillation of the body becomes larger, the amplitude of the oscillation is reduced to be smaller than the amplitude at the zero frequency. Therefore, when the frequency of the body is set to be equal to or smaller than square root of two times the resonant frequency of the massive body, the amplitude of the oscillation is equal to or smaller than that of the zero frequency. In this case, the amplitude of the oscillation, i.e., the displacement of the oscillation can be reduced.

In the third embodiment, the oscillator 103 in the chip 100 has the resonant frequency defined as FD in the driving direction, and the movable electrode 203 in the chip 200 has the resonant frequency FS in the detection direction. The resonant frequency FD of the oscillator 103 and the resonant frequency FS of the movable electrode 203 have a relationship of $FD \geq \sqrt{2} \times FS$. To obtain this relationship, one of the resonant frequency FS of the movable electrode 203 and the resonant frequency FD of the oscillator 103, or both of them are adjusted.

In general, a resonant frequency is determined by a mass of the body and a spring constant of the body. In this embodiment, the mass of the oscillator 103 and the shape of the driving beam 107 are optimally determined to adjust the resonant frequency FD of the oscillator 103 in the driving direction. Further, the mass of the movable electrode 203 and the shape of the spring 206 are optimally determined to adjust the resonant frequency FS of the movable electrode 203 in the detection direction.

Thus, the oscillation amplitude of the oscillator 103 in the chip 100 is optimally reduced at the acceleration sensor chip 200 in the detection direction. Accordingly, the physical quantity sensor having the oscillation type angular speed sensor chip 100 and the acceleration sensor chip 200 detects both of the angular speed and the acceleration with high accuracy.

Fourth Embodiment

A physical quantity sensor according to a fourth embodiment of the present invention has a construction such that the driving direction of the oscillator 103 in the chip 100 is parallel to the displacement direction of the movable electrode 203.

Figure 8:
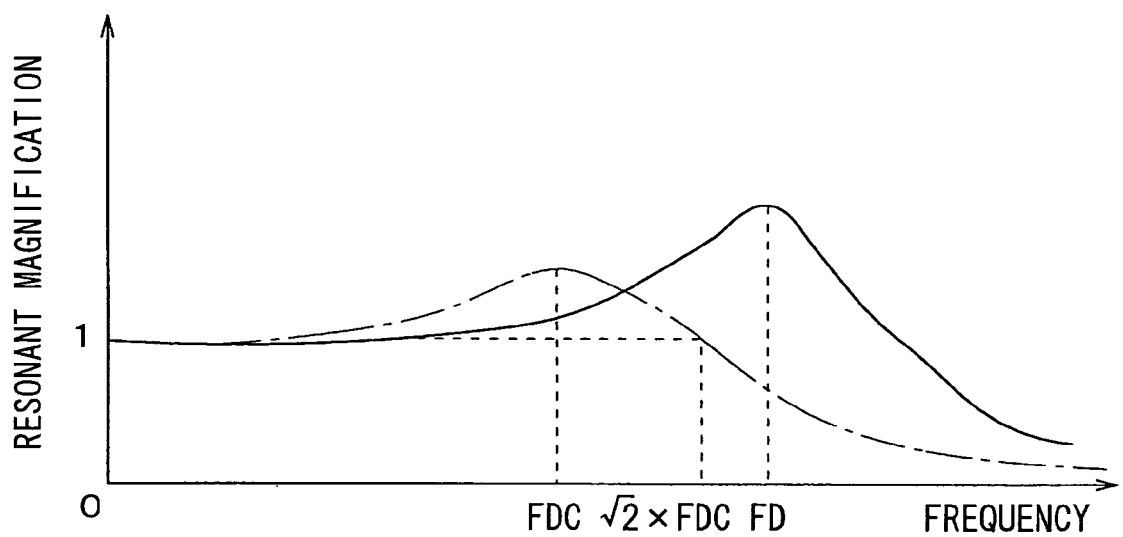
FIG. 8 is a graph showing a relationship between a resonant magnification and a frequency in the angular speed sensor chip and an adhesive layer of the angular speed sensor chip according to a fourth embodiment of the present invention.

FIG. 8 is a graph showing a relationship between a frequency and a resonant ratio. In FIG. 8, a solid line represents a characteristic of a mechanical frequency dependence of the angular speed sensor chip 100 in the driving direction. A dashed line represents a characteristic of a mechanical frequency dependence of the adhesive layer 400. The adhesive layer 400 is disposed between the angular speed sensor chip 100 and the mounting base 300 to bond therebetween.

In the fourth embodiment, the oscillator 103 in the chip 100 has the resonant frequency defined as FD in the driving direction, and the adhesive layer 400 has the resonant frequency FDC. The resonant frequency FD of the oscillator 103 and the resonant frequency FDC of the adhesive layer 400 have a relationship of $FD \geq \sqrt{2} \times FDC$. To obtain this relationship, one of the resonant frequency FDC of the adhesive layer 400 and the resonant frequency FD of the oscillator 103, or both of them are adjusted.

In this embodiment, the mass of the oscillator 103 and the shape of the driving beam 107 are optimally determined to adjust the resonant frequency FD of the oscillator 103 in the driving direction. Further, the shape and/or the material of the adhesive layer 400 are optimally determined to adjust the resonant frequency FDC of the adhesive layer 400. For example, since the spring constant of the adhesive layer 400 is in proportion to Young's modulus of the adhesive layer 400, the thickness of the adhesive layer 400 becomes thicker so that Young's modulus of the adhesive layer 400 becomes lower. Further, when the adhesive layer 400 is made of material having high flexibility, for example, when the adhesive layer 400 is made of silicon adhesive material, Young's modulus of the adhesive layer 400 becomes smaller. Thus, the resonant frequency FDC of the adhesive layer 400 becomes smaller.

Thus, the oscillation amplitude of the oscillator 103 in the chip 100 is optimally reduced at the acceleration sensor chip 200 in the detection direction. Accordingly, the physical quantity sensor having the oscillation type angular speed sensor chip 100 and the acceleration sensor chip 200 detects both of the angular speed and the acceleration with high accuracy.

Fifth Embodiment

A physical quantity sensor according to a fifth embodiment of the present invention has a construction such that the driving direction of the oscillator 103 in the chip 100 is parallel to the displacement direction of the movable electrode 203.

Figure 9:
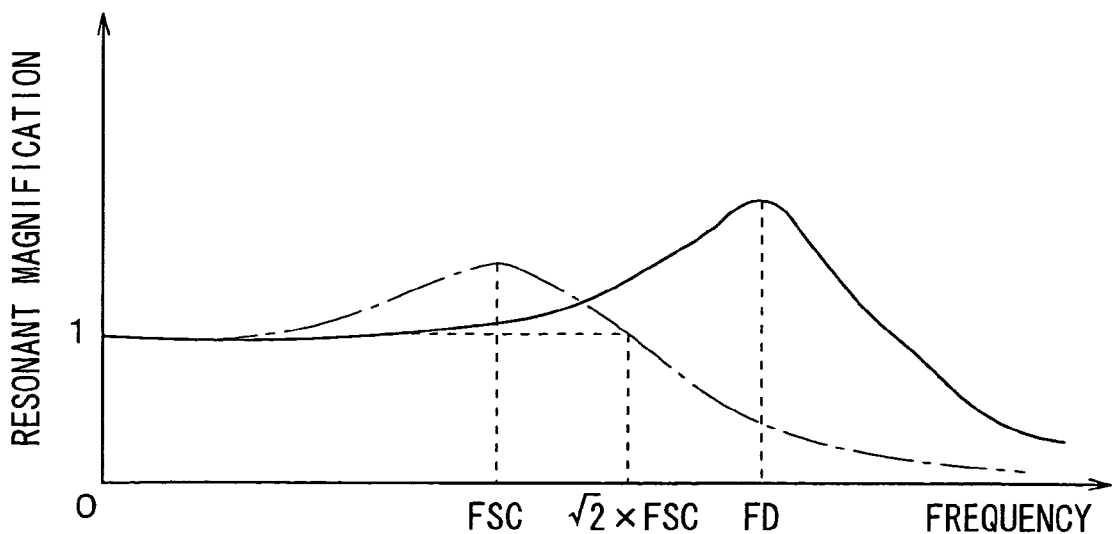
FIG. 9 is a graph showing a relationship between a resonant magnification and a frequency in the angular speed sensor chip and an adhesive layer of the acceleration sensor chip according to a fifth embodiment of the present invention.

FIG. 9 is a graph showing a relationship between a frequency and a resonant ratio. In FIG. 9, a solid line represents a characteristic of a mechanical frequency dependence of the angular speed sensor chip 100 in the driving direction. A dashed line represents a characteristic of a mechanical frequency dependence of the adhesive layer 500. The adhesive layer 500 is disposed between the acceleration sensor chip 200 and the mounting base 300 to bond therebetween.

In the fifth embodiment, the oscillator 103 in the chip 100 has the resonant frequency defined as FD in the driving direction, and the adhesive layer 500 has the resonant frequency FSC. The resonant frequency FD of the oscillator 103 and the resonant frequency FSC of the adhesive layer 500 have a relationship of $FD \geq \sqrt{2} \times FSC$. To obtain this relationship, one of the resonant frequency FSC of the adhesive layer 500 and the resonant frequency FD of the oscillator 103, or both of them are adjusted.

In this embodiment, the mass of the oscillator 103 and the shape of the driving beam 107 are optimally determined to adjust the resonant frequency FD of the oscillator 103 in the driving direction. Further, the shape and/or the material of the adhesive layer 500 are optimally determined to adjust the resonant frequency FSC of the adhesive layer 500. For example, since the spring constant of the adhesive layer 500 is in proportion to Young's modulus of the adhesive layer 500, the thickness of the adhesive layer 500 becomes thicker so that Young's modulus of the adhesive layer 500 becomes lower. Further, when the adhesive layer 500 is made of material having high flexibility, for example, when the adhesive layer 500 is made of silicon adhesive material, Young's modulus of the adhesive layer 500 becomes smaller. Thus, the resonant frequency FSC of the adhesive layer 500 becomes smaller.

Thus, the oscillation amplitude of the oscillator 103 in the chip 100 is optimally reduced at the acceleration sensor chip 200 in the detection direction. Accordingly, the physical quantity sensor having the oscillation type angular speed sensor chip 100 and the acceleration sensor chip 200 detects both of the angular speed and the acceleration with high accuracy.

Such changes and modifications are to be understood as being within the scope of the present invention as defined by the appended claims.

What is claimed is:

1. A physical quantity sensor comprising:
   a substrate;
   an angular speed sensor disposed on the substrate; and
   an acceleration sensor disposed on the substrate, wherein
   the angular speed sensor includes an oscillator capable of oscillating by a driving force and displaceable in accordance with a Coriolis force attributed to an angular speed of to oscillator,
   the acceleration sensor includes a movable portion displaceable in accordance with an acceleration of the acceleration sensor, and the oscillator has a driving direction, which is not parallel to a displacement direction of the movable portion, the oscillator of the annular speed sensor has a resonant frequency in the driving direction, the acceleration sensor is disposed on the substrate through an adhesive layer, the adhesive layer of the acceleration sensor has another resonant frequency, and the resonant frequency of the oscillator in the driving direction is greater than or equal to square root of two times the resonant frequency of the adhesive layer in the displacement direction.

2. The sensor according to claim 1, wherein the driving direction of the oscillator and the displacement direction of the movable portion provide an angle therebetween, and the angle is in a range between 60 degrees and 120 degrees.

3. The sensor according to claim 2, wherein
the angle is substantially 90 degrees.

4. The sensor according to claim 1, wherein the oscillator of the angular speed sensor has a resonant frequency in the driving direction, the movable portion of the acceleration sensor has another resonant frequency in the displacement direction, and the resonant frequency of the oscillator is equal to or larger than square root of two times the resonant frequency of the movable portion.

5. The sensor according to claim 1, wherein the oscillator of the angular speed sensor has a resonant frequency in the driving direction, the angular speed sensor is disposed on the substrate through an adhesive layer, the adhesive layer of the angular speed sensor has another resonant frequency, and the resonant frequency of the oscillator is equal to or larger than square root of two times the resonant frequency of the adhesive layer.

6. A physical quantity sensor comprising:

a mounting base;

an angular speed sensor disposed on the mounting base; and an acceleration sensor disposed on the mounting base, wherein the angular speed sensor includes an oscillator capable of oscillating by a driving force and capable of being displaced in accordance with a Coriolis force attributed to an angular speed applied to the angular speed sensor, the acceleration sensor includes a movable portion displaceable in accordance with an acceleration applied to the acceleration sensor, the oscillator of the angular speed sensor has a resonant frequency in a driving direction, the movable portion of the acceleration sensor has another resonant frequency in a displacement direction which is not parallel to the direction—has been inserted after, and the resonant frequency of the oscillator in the driving direction is equal to or larger than square root of two times the resonant frequency of the movable portion in the displacement direction.

7. A physical quantity sensor comprising:

a mounting base;

an angular speed sensor disposed on the mounting base; and an acceleration sensor disposed on the mounting base, wherein the angular speed sensor includes an oscillator capable of oscillating by a driving force in a driving direction and capable of being displaced in accordance with a Coriolis force attributed to an angular speed applied to the angular speed sensor, the acceleration sensor includes a movable portion displaceable in accordance with an acceleration applied to the acceleration sensor in a displacement direction which is not parallel to the driving direction—has been inserted after, the oscillator of the angular speed sensor has a resonant frequency in the driving direction, the angular speed sensor is disposed on the mounting base through an adhesive layer, the adhesive layer of the angular speed sensor has another resonant frequency, and the resonant frequency of the oscillator in the driving direction is equal to or larger than square root of two times the resonant frequency of the adhesive layer in the displacement direction.

8. A physical quantity sensor comprising:

a mounting base;

an angular speed sensor disposed on the mounting base; and an acceleration sensor disposed on the mounting base, wherein the angular speed sensor includes an oscillator capable of oscillating by a driving force in a driving direction and capable of being displaced in accordance with a Coriolis force attributed to an angular speed applied to the oscillator, the acceleration sensor includes a movable portion displaceable in accordance with an acceleration applied to the acceleration sensor in a displacement direction which is not parallel to the driving direction, the oscillator of the angular speed sensor has a resonant frequency in the driving direction, the acceleration sensor is disposed on the mounting base through an adhesive layer, the adhesive layer of the acceleration sensor has another resonant frequency, and the resonant frequency of the oscillator in the driving direction is equal to or larger than square root of two times the resonant frequency of the adhesive layer in the displacement direction.

* * * * *